United States Patent
Van Den Heuvel et al.

(10) Patent No.: US 7,190,697 B2
(45) Date of Patent: Mar. 13, 2007

(54) MULTIPLEXING OF SELECTION FROM AMONG STREAMS AND PARSED-OUT TIME SYNCHRONIZATION INFORMATION

(75) Inventors: Sebastiaan Antonius Fransiscus Arnoldus Van Den Heuvel, Eindhoven (NL); Mark Henricus Verberkt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1050 days.

(21) Appl. No.: 09/790,186

(22) Filed: Feb. 22, 2001

(65) Prior Publication Data

US 2001/0028663 A1 Oct. 11, 2001

(30) Foreign Application Priority Data

Feb. 23, 2000 (EP) .................................. 00200618

(51) Int. Cl.
*H04J 3/24* (2006.01)
(52) U.S. Cl. ...................... 370/394; 370/467; 370/474; 370/503
(58) Field of Classification Search ................ 370/244, 370/252, 394–398, 468, 474, 503, 517
See application file for complete search history.

(56) References Cited

U.S. PATENT DOCUMENTS

| | | | | |
|---|---|---|---|---|
| 5,703,793 A | * | 12/1997 | Wise et al. | 382/232 |
| 5,905,732 A | * | 5/1999 | Fimoff et al. | 370/516 |
| 5,920,572 A | * | 7/1999 | Washington et al. | 370/535 |
| 6,002,687 A | * | 12/1999 | Magee et al. | 370/394 |
| 6,111,896 A | * | 8/2000 | Slattery et al. | 370/535 |
| 6,356,567 B2 | * | 3/2002 | Anderson et al. | 370/516 |
| 6,724,825 B1 | * | 4/2004 | Nemiroff et al. | 375/240.27 |
| 6,738,427 B2 | * | 5/2004 | Zetts | 375/240.28 |

FOREIGN PATENT DOCUMENTS

EP 0917355 A1 5/1999

* cited by examiner

*Primary Examiner*—Zarni Maung
*Assistant Examiner*—Van Kim T. Nguyen

(57) ABSTRACT

A method, transmitter and transmission system for transmitting an MPEG-2 transport stream, wherein a portion of the offered transport stream (20) is selected and transmitted as a partial transport stream (27). When the elementary stream containing the PCR (24) is not part of the selected portion, a new elementary stream (26) containing only the PCR is created and transmitted instead of the original elementary stream (24). This is done by copying the relevant information from the packets in the original elementary stream (24) into new packets.

23 Claims, 1 Drawing Sheet

Figure 1:
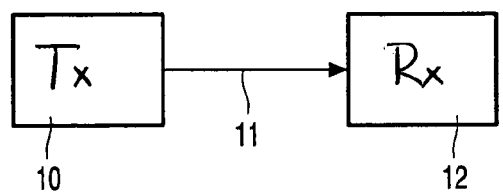

MULTIPLEXING OF SELECTION FROM AMONG STREAMS AND PARSED-OUT TIME SYNCHRONIZATION INFORMATION

The invention relates to a method of processing a multiplex signal, the signal containing at least a stream with information for enabling time synchronization, while a selection of a part of the multiplex signal is made and the selection is transmitted, and the stream with information for enabling time synchronization lies outside the selection.

The invention further relates to a transmitter for processing a multiplex signal, the signal containing at least a stream with information for enabling time synchronization, while the transmitter is arranged for making a selection of a part of the multiplex signal and transmitting the selection, and the stream with information for enabling time synchronization lies outside the selection.

The invention furthermore relates to a transmission system for processing a multiplex signal, the system comprising a transmitter and a receiver, the signal containing at least a stream in which information for enabling time synchronization is included, the transmitter being arranged for making a selection of a part of the multiplex signal and the transmission of the selection, and the stream with information for enabling time synchronization lies outside the selection.

When video, audio and other signals are transmitted, the signals are often coded according to the MPEG-2 standard. The signals to be transmitted are coded to so-called elementary streams. These streams are then combined (multiplexed) for transmission and thus form a transport stream. A transport stream is formed by packets. A packet may contain part of an elementary stream and then has a program identifier (PID) of the respective elementary stream. With the aid of the PID the elementary stream may be reconstructed from the individual packets. A packet may also contain an information section with information about the elementary streams, such as, for example, the association between a program and the associated elementary streams with the audio and video information of that program, or, for example, the entitlement management and control messages. The transmitter sends the whole transport stream to a receiver, which can then reconstruct the elementary streams with the aid of the PIDs, read the information sections and reconstruct the desired signals for the user.

One of the elementary streams contains information for enabling time synchronization. In the case of MPEG-2, this is the Program Clock Reference (PCR). With the aid of this information the receiver can provide that all desired signals are reconstructed from their respective elementary streams in synchronism. Since this information is to be present with great regularity for the time synchronization, this information is usually included in the elementary stream having the largest bit rate, which is generally the video stream.

It may be desirable to send not all the elementary streams from the transport stream, but only part thereof. The transmitter then makes a selection from the available elementary streams and thus forms a partial transport stream. This selection need not always contain the elementary stream in which the information for enabling time synchronization is included. It is customary to include in the partial transport stream as yet the elementary stream, which contains this information. This technique has the drawback that a large bandwidth is used, whereas only a small part of the contents of the transmitted streams is necessary. This gives a waste of bandwidth.

It is an object of the invention to provide a method of the type defined in the opening paragraph in which a saving of bandwidth is obtained.

This object is achieved by the method in accordance with the invention in that a new stream is made containing the information for enabling time synchronization and the new stream is transmitted. It is now possible to omit the existing stream containing the information for enabling time synchronization. An advantage of this method is that since the new stream contains only packets with the information for enabling time synchronization, this new stream is much smaller than the existing stream. A typical video stream requires 6 Mb/s of bandwidth, whereas a typical stream having only the information for enabling time synchronization requires only 20 times per second a packet that has a size of 188 bytes, that is, only 0.003008 Mb/s. Application of the method yields a saving of 5.997 Mb/s.

In a particular embodiment of the method the stream containing information for enabling time synchronization has an identification code and the new stream is given the same identification code.

In a particular embodiment of the method the selection and the new stream are transmitted by combining them to a second multiplex signal and transmitting the second multiplex signal.

It is also an object of the invention to provide a transmitter of the type defined in the opening paragraph, for which a saving of bandwidth is made possible.

This object is achieved with the transmitter in accordance with the invention in that the transmitter is arranged for making a new stream containing the information for enabling time synchronization and transmitting the new stream.

In a particular embodiment of the transmitter the stream containing information for enabling time synchronization has an identification code and the transmitter is arranged for giving the new stream the same identification code.

In a particular embodiment of the transmitter the transmitter is arranged for transmitting the selection and the new stream by combining them to a second multiplex signal and transmitting the second multiplex signal.

It is also an object of the invention to provide a transmission system of the type defined in the opening paragraph, in which a saving of bandwidth is made possible.

This object is achieved with the transmission system in accordance with the invention in that the transmitter is arranged for making a new stream containing the information for enabling time synchronization and transmitting the new stream.

In a particular embodiment of the transmission system the stream containing information for enabling time synchronization has an identification code and the transmitter is arranged for giving the new stream the same identification code.

In a particular embodiment of the transmission system the transmitter is arranged for transmitting the selection and the new stream by combining them to a second multiplex signal and transmitting the second multiplex signal.

Figure 2:
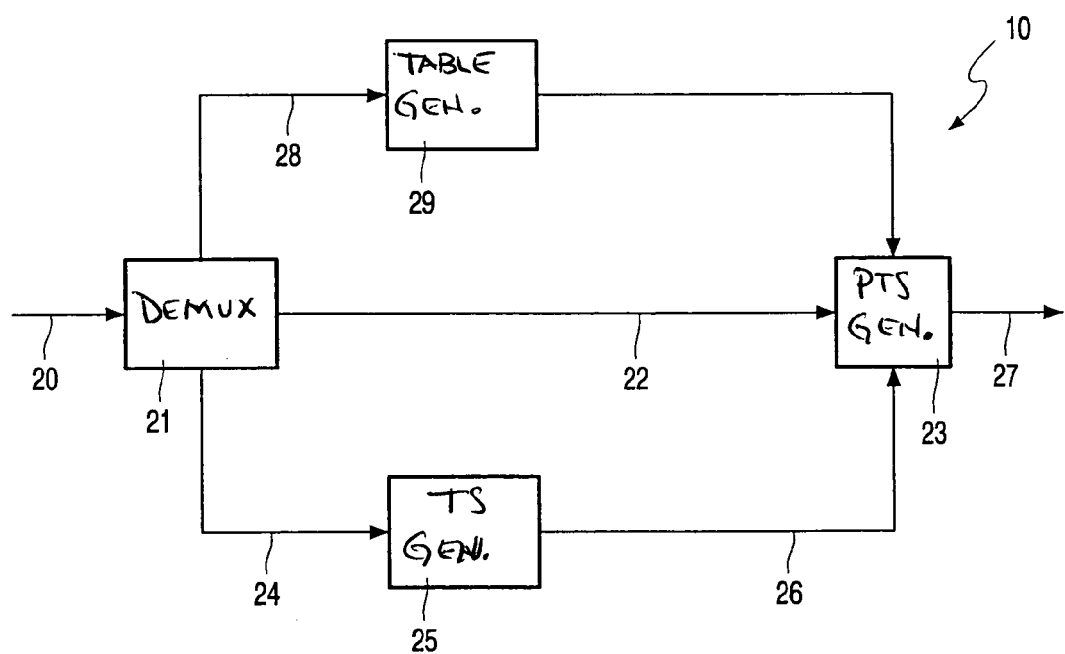

These and other aspects of the invention will be further described with reference to the drawing, in which:

FIG. 1 is a diagrammatic representation of a transmission system in accordance with the invention; and FIG. 2 is a diagrammatic representation of a transmitter in accordance with the invention.

In FIG. 1 is shown a transmission system for processing a multiplex signal 11 from a transmitter 10 to a receiver 12. The signal contains at least a stream including information for enabling time synchronization. As will appear from the description of FIG. 2, the transmitter 10 is arranged for making a selection of a part of the multiplex signal 11 and transmitting the selection, the stream containing information for enabling time synchronization lies outside the selection and the transmitter 10 is arranged for making a new stream containing the information for enabling time synchronization and transmitting the new stream.

FIG. 2 shows a transmitter for processing a multiplex signal 20. Only the components which are important to the invention are shown. The signal 20 contains at least a stream with information for enabling time synchronization. In the transmitter of FIG. 2 an MPEG-2 transport stream is assumed, in which the information for enabling time synchronization is the Program Clock Reference (PCR).

A transmitter as shown in FIG. 2 may be realized in many forms, for example, as a residential gateway with In-Home Networking. This gateway receives from elsewhere a transport stream and conveys it on to a plurality of receivers such as television sets. These television sets are usually connected to the transmitter via a local network.

The demultiplexer 21 is arranged for making a selection of a part of the transport stream 20 offered. The selection 22 is sent to the PTS generator 23. The demultiplexer 21 too is arranged for reading the tables of information about the various streams etc., which tables occur in the transport stream 20. These tables are passed on to the table generator 29.

If the stream in which the PCR occurs lies outside the selection 22, the demultiplexer 20 sends this stream 24 to the time stream generator 25. The latter detects in the received stream 24 all the packets that include PCR information and removes the others. The time stream generator 25 then generates a new stream 26. The PCR information is included in the new stream 26 by reading the PCR information from each detected packet and making a corresponding new packet for the new stream in which this information is included.

The new stream 26 may be sent in various ways. A possible way is to arrange the PTS generator 23 for combining the new stream 26 and the selection 22 to a second multiplex signal 27. This second multiplex signal 27 may then be transmitted.

The making of a new packet comprises, in addition to copying the PCR information, also the stuffing of the rest of the packet. In the case of MPEG-2, a packet has a predetermined size and the PCR information uses up only a small part of that size. This may be effected in two ways: in the adaptation field or in the payload. The stuffing data in the payload has the drawback that some implementations interpret the stuffing data as real payload.

When the adaptation field is filled, the packet has the following format (the notation is borrowed from the MPEG-2 standard):

| Syntax | No. of bits | Mnemonic | Value |
|---|---|---|---|
| transport_packet() { | | | |
| sync_byte | 8 | uimsbf | 0x47 |
| transport_error_indicator | 1 | bslbf | '0' |
| payload_unit_start_indicator | 1 | bslbf | '0' |
| transport_priority | 1 | bslbf | '0' |
| PID | 13 | uimsbf | |
| transport_scrambling_control | 2 | bslbf | '00' |
| adaptation_field_control | 2 | bslbf | '10' |

-continued

| Syntax | No. of bits | Mnemonic | Value |
|---|---|---|---|
| continuity_counter | 4 | uimsbf | |
| adaptation_field_length | 8 | uimsbf | 183 |
| discontinuity_indicator | 1 | bslbf | '0' |
| random_access_indicator | 1 | bslbf | '0' |
| elementary_stream_priority_indicator | 1 | bslbf | '0' |
| PCR_flag | 1 | bslbf | '1' |
| OPCR_flag | 1 | bslbf | '0' |
| splicing_point_flag | 1 | bslbf | '0' |
| adaptation_field_extension_flag | 1 | bslbf | '0' |
| program_clock_reference_base | 33 | uimsbf | |
| reserved | 6 | bslbf | '111111' |
| program_clock_reference_extension | 9 | uimsbf | |
| stuffing_data | 76 | uimsbf | |
| } | | | |

The fields for which no value is given in the above Table will be further discussed hereinbelow.

The field "PID" contains the Program Identifier of the packet from which the PCR is read.

For the field "continuity_counter" a fixed value is to be chosen according to the MPEG-2 standard.

The PCR is stored in the fields "program_clock_reference_base" and "program clock_reference_extension". The time stream generator 25 reads the values of these fields from each detected packet and copies them to the corresponding new packet.

The stream which contains the PCR has an identification code, the Program Identifier (PID). The time stream generator 25 is preferably arranged for giving the new elementary stream 26 the same identification code, so that the table generator 29 does not need to make adaptations or modifications in the received information sections 28 before passing them on to the PTS generator 23.

The rest of the packet comprises the "stuffing_data" field, which contains the stuffing data. There is no prescribed value for the contents of this field. A possible value is '0xFF'.

The invention claimed is:

1. A method for processing a multiplex signal containing a first stream including information for enabling time synchronization and a payload, the method comprising the acts of:
    selecting a part of the multiplex signal
    forming a second stream by copying from the first stream the information for enabling time synchronization into the second stream while discarding the payload of the first stream, wherein the stream with information for enabling time synchronization lies outside the selection; and
    transmitting the second stream.

2. The method as claimed in claim 1, wherein the first stream with information has an identification code and the second stream is given the same identification code.

3. The method as claimed in claim 1, wherein the selection and the second stream are transmitted by combining them to form a second multiplex signal and transmitting the second multiplex signal.

4. The method of claim 1, wherein the information is included in the second stream by reading the information from a detected packet and making a corresponding new packet in which the read information is included.

5. The method of claim 1, wherein a non-selected part of the multiplex signal lies outside the first stream with information for enabling time synchronization.

6. The method of claim 1, wherein the forming of the second stream comprises the act of excluding from a non-selected part of the multiplex signal, packets that lack information for enabling time synchronization.

7. The method of claim 1, wherein the copying comprises acts including detecting the information, reading the detected information, and including the read information in the forming.

8. A transmitter configured to process a multiplex signal containing at least a stream with information for enabling time synchronization and a payload, the transmitter being arranged for making a selection of a part of the multiplex signal and transmitting the selection, the stream with information for enabling time synchronization lying outside the selection, wherein the transmitter is arranged for copying from the stream the time synchronization information into a new stream that does not include the payload and transmitting the new stream.

9. The transmitter as claimed in claim 8, wherein the stream with information has an identification code and the transmitter is arranged for giving the new stream the same identification code.

10. The transmitter as claimed in claim 8, wherein the transmitter is arranged for transmitting the selection and the new stream by combining them to form a second multiplex signal and transmitting the second multiplex signal.

11. The transmitter of claim 8, wherein the information is included in the new stream by reading the information from a detected packet and making a corresponding new packet in which the read information is included and the payload is excluded.

12. The transmitter of claim 8, wherein a non-selected part of the multiplex signal lies outside the stream with information for enabling time synchronization.

13. The transmitter of claim 8, wherein the forming of the new stream comprises the act of excluding, from a non-selected part of the multiplex signal, packets that lack information for enabling time synchronization.

14. The transmitter of claim 8, wherein the copying comprises acts including detecting the information, reading the detected information, and including the read information in the new stream.

15. A transmission system for processing a multiplex signal, the system comprising a transmitter and a receiver, the signal containing at least a stream in which information for enabling time synchronization and a payload is included, the transmitter being arranged for making a selection of a part of the multiplex signal and the transmission of the selection, the stream with information for enabling time synchronization lying outside the selection, wherein the transmitter is arranged for copying from the stream, the time synchronization information into a new stream that does not include the payload and transmitting the new stream.

16. The transmission system as claimed in claim 15, wherein the stream with information has an identification code and the transmitter is arranged for giving the new stream the same identification code.

17. The transmission system as claimed in claim 15, wherein the transmitter is arranged for transmitting the selection and the new stream by combining them to form a second multiplex signal and transmitting the second multiplex signal.

18. The transmission system of claim 15, wherein the information is included in the new stream by reading the information from a detected packet and making a corresponding new packet in which the read information is included and the payload is excluded.

19. The transmission system of claim 15, wherein a non-selected part of the multiplex signal lies outside the stream with information for enabling time synchronization.

20. The transmission system of claim 15, wherein the forming of the new stream comprises the act of excluding, from a non-selected part of the multiplex signal, packets that lack information for enabling time synchronization.

21. The system of claim 15, wherein the copying comprises acts including detecting the information, reading the detected information, and including the read information in the new stream.

22. A transmitter for processing a multiplex signal containing at least an elementary stream with information for enabling time synchronization and a payload, the transmitter being arranged for making a selection of a part of the multiplex signal and transmitting the selection from the transmitter, the elementary stream with information for enabling time synchronization lying outside the selection, wherein the transmitter is arranged for demultiplexing, from the multiplex signal, the selection from the elementary stream lying outside the selection;

reading the information from the demultiplexed elementary stream;

using the read information to make a new stream that excludes the payload; and transmitting the new stream.

23. A computer program embodied within a memory readable by a computer, the program comprising a portion configured to process a multiplex signal containing at least a stream with information for enabling time synchronization and a payload, and configured to make a selection of a part of the multiplex signal and transmit selection, the stream with information for enabling time synchronization lying outside the selection a portion configured to copy from the stream the information for enabling time synchronization into a new stream excluding the payload; and transmitting the new stream.

* * * * *